(12) United States Patent
Potsaid et al.

(10) Patent No.: US 7,742,213 B2
(45) Date of Patent: Jun. 22, 2010

(54) ADAPTIVE-SCANNING OPTICAL MICROSCOPE

(75) Inventors: Benjamin Michael Potsaid, Troy, NY (US); Yves Bellouard, Albany, NY (US); John T. Wen, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 382 days.

(21) Appl. No.: 11/758,117

(22) Filed: Jun. 5, 2007

(65) Prior Publication Data

US 2007/0253057 A1 Nov. 1, 2007

(51) Int. Cl.
*G02B 26/08* (2006.01)
(52) U.S. Cl. .................................. 359/212.1
(58) Field of Classification Search ... 359/212.1–215.1, 359/205.1–207.6
See application file for complete search history.

(56) References Cited

U.S. PATENT DOCUMENTS

| 7,364,296 | B2 * | 4/2008 | Miller et al. ................. 351/206 |
| 2001/0043391 | A1 * | 11/2001 | Shafer et al. ................ 359/365 |
| 2004/0223214 | A1 | 11/2004 | Atkison | |

* cited by examiner

*Primary Examiner*—Euncha P Cherry
(74) *Attorney, Agent, or Firm*—Notaro, Michalos & Zaccaria P.C.

(57) ABSTRACT

An adaptive scanning optical microscope has a scanner lens assembly for acquiring images from different parts of an object plane and for forming a preferably curved image field having at least some aberration which varies as a function of the part of the object plane from which the image is acquired. A steering mirror selects the field of view and steers light from the object and along a light path from the object plane to a final image plane. An adaptive optics element receives the steered light from the object and compensates for the field position dependent optical aberrations and additional optics are along at least part of the light path for conditioning and focusing the light as it moves from the steering mirror, past the adaptive optics element and to the final image plane.

24 Claims, 10 Drawing Sheets

ADAPTIVE-SCANNING OPTICAL MICROSCOPE

CROSS-REFERENCE TO RELATED APPLICATION

This application claims priority on PCT/US2005/047287, filed Dec. 29, 2005, which claims priority on U.S. Provisional Patent Application No. 60/647,572, filed Jan. 27, 2005, which application is incorporated here by reference.

FIELD AND BACKGROUND OF THE INVENTION

The present invention relates generally to the field of optical microscopy and, in particular, to a new and useful adaptive scanning optical microscope which addresses and improves upon, the usual trade-off between resolution and field of view that is common for known optical microscopes.

The inventors have disclosed an earlier approach to solving this trade-off problem in U.S. patent application Ser. No. 10/525,422 filed Feb. 25, 2005. This application claims priority on U.S. Provisional Patent Application No. 60/411,038 and International Application No. PCT/US2003/029332, published as WO 2004/025331, all of which are also incorporated here by reference.

For a wide range of applications (e.g. micro-assembly, biological observation, observation and manipulation for biotechnology, medical diagnostics, manufacturing, inspection, etc.), the optical microscope remains one of the most important tools for observing below the threshold of the naked human eye. However, in its conventional form, it suffers from the trade-off mentioned above, between resolution and field of view. The present invention is a new optical microscope design that combines a scanner lens, a steering mirror, an adaptive optics element, adaptive optics (AO) conditioning optics, and imaging optics to enlarge the field of view while preserving resolving power in the acquired images. This instrument has the ability to operate at high image acquisition rates for increased throughput or to facilitate certain spatial-temporal observations.

Along with the recent growth of biotechnology and micro-electro-mechanical systems (MEMS), as well as an industrial trend toward miniaturization, there is a growing need to observe, interact with, and inspect at a scale below the threshold of the naked human eye. Fulfilling this need, the optical microscope has seen a resurgence of interest and will continue to be a critical tool as these fields advance. However, the essential optical design and operating principle has not changed significantly in the last century, and the optical microscope still suffers from a well known inherent tradeoff between the field of view and resolving power of the imaging system.

The present invention, as will be explained more fully later in this disclosure, achieves an expanded field of view at high resolution by integrating active optical elements, motion control, and image processing techniques with traditional static optical elements in a tightly integrated fashion.

The motivation for expanding the field of view initially came from the inventors' experiences in micro-assembly and precision manufacturing. Vision guided micro-assembly often requires the near-simultaneous monitoring of widely separated part features at micron to sub-micron level resolution (e.g. monitoring multiple critical edges of a micro-mirror and optical sensor being assembled onto a substrate). Because a single microscope can not offer an adequately large field of view at the required resolution, multiple microscopes and/or a moving stage provide a readily available off-the-shelf solution. However, the limitation in movements per second and agitation of the specimen due to the moving stage, and considerable effort required to reposition and calibrate multiple microscopes for each new assembly task, suggested to the inventors, a need for a new optical microscope design to address these issues.

For the same reasons, such a microscope would also be desirable for biological and medical imaging as well as industrial manufacturing and inspection as is performed using machine vision. The inventors first design which was disclosed in their earlier U.S., PCT and provisional patent applications identified above, and in the article B. Potsaid, Y. Bellouard, and J. T. Wen, "Scanning optical mosaic scope for micro-manipulation," in *Int. Work-shop on Micro-Factories* (*IWMF*02), R. Hollis and B. J. Nelson, eds., pp. 85-88 (2002), was called a Scanning Optical Mosaic Scope (SOMS), and was constructed to demonstrate the advantages of combining a high speed post-objective scanning system with real-time mosaic constructing techniques for use in micro-assembly and biological imaging. The optical layout for the previously disclosed SOMS was originally inspired by a machine created for laser annealing shape memory alloy. See M. Hafez, Y. Bellouard, T. Sidler, R. Clavel, and R.-P. Salathe, "Local annealing of shape memory alloys using laser scanning and computervision," in *Laser Precision Microfabrication*, I. Miyamoto, K. Sugioka, and T. Sigmon, eds., Proc. SPIE 4088, pp. 160-163 (2000). This approach shares the concept of a post-objective 2-D scanning mirror. This configuration is also used in several commercial products, but in its basic form, has a limited field of view because of off-axis aberrations in the scanner lens. The present invention addresses this issue to offer a larger field of view.

The design of wide field and high resolution microscopic imaging systems are driven by consideration of (1) an image sampling issue and (2) an image quality issue. First, consider an imaging system with optics that are nearly perfect (i.e. the optical aberrations are much below the diffraction limit). Such a system will image two point sources separated by a distance, d, as two overlapping Airy patterns in an image field. As the distance between the two points decreases, a critical distance will be reached, r, where the two points can no longer be individually distinguished. According to the Rayleigh criteria, this critical distance, called the resolution, occurs when the center of one Airy disk falls on the first minimum of the other and is related to the numerical aperture, NA, of the system and the wavelength of light, $\lambda$. The NA of the system is a function of the index of refraction of the transmitting medium, n, and the half angle of the cone of light collected from the object.

A digital camera must sample with two pixels per Airy core radius to avoid aliasing according to the Nyquist sampling criteria. This observation provides a maximum theoretical object field width, Wo, for a sensor array pixel count per edge, k, and resolution, r.

While microscopic imaging systems are often designed with resolutions in the ¼ µm to several µm range, the lower practical limit on CCD camera pixel size is approximately 6 µm due to noise effects. Therefore, the optics must enlarge the Airy pattern to achieve proper sampling, with the required minimum magnification factor, M, for a given sensor pixel size, s. At this critical magnification, the corresponding image size, Wi, is: Wi=ks. Imaging optics to achieve this can be thought of as a generic black box. The optical design task is to specify the design of the imaging system, i.e., to fill in the details of the black box with specific lens or mirror geometries, glass types, and spacing.

An intuitive approach to designing a large field and high resolution imaging system might be to take an existing microscope layout, and simply increase the pixel count of the camera while redesigning the optics to achieve a larger field of view. This approach may indeed be possible, but it is not generally practical as the requirements for field size, flat field, and numerical aperture soon approach those of lithography lenses. The 1998 Nikon lithography lens (see U.S. Pat. No. 5,805,344 for example) has a 0.65 NA with field sizes of 93.6 mm and 23.4 mm for the mask and wafer image respectively.

Lithography lenses require near perfect manufacturing and extremely tight assembly tolerances (often requiring an interferometric assembly process), and can cost in the millions of dollars. Also, negatively powered elements are required and are located at narrow beam regions in both the microscope and lithography lenses and positively powered elements where the beam is wide. This design technique is used to achieve a flat imaging field (small Petzval sum) and results in an increase in the lens count and optical complexity. An additional consideration is the size of the image sensor, given that large commercially available CCD cameras only have approximately 9216×9216 pixels (e.g. Fairchild Imaging CCD595). Smaller CCD arrays can be assembled into a mosaic to achieve larger pixel count with the advantage of being able to read data off the imaging chips in parallel (data rates forgetting the image data off the chip can be the limiting factor determining maximum refresh rates), but at a cost of additional precision assembly requirements. Even with modern technology and manufacturing capabilities, a large field and high resolution imaging system based on a purely static optical design will only see limited application because of the exceedingly high cost, large size, tight assembly tolerances, and optical complexity.

Some of the alternative modern approaches to address the field size and resolution tradeoff are summarized in Table 1 which includes the performance of the present invention for comparison. The first five methods (multiple parfocal objectives through multiple microscopes) are well established and quite common. In this table, the "basic post-objective scanning" method refers to the commercially available units, which are limited to very low numerical aperture and suffer from considerable off-axis aberration because of the system layout. Of particular interest is the array microscope sold by Dmetrix. Dmetrix is covered by several patents, for example: U.S. Pat. No. 6,958,464, for an Equalization for a multi-axis imaging system; U.S. Pat. No. 6,950,241 for a Miniature microscope objective for an array microscope; U.S. Pat. No. 6,905,300 for a Slide feeder with air bearing conveyor; and U.S. Pat. No. 6,842,290 for a Multi-axis imaging system having individually-adjustable elements. This system uses an array of 80 miniature microscopes (each of 3 element aspheric design) working in parallel to rapidly acquire the image. By slowly advancing the microscope array along the length of a microscope slide, a large composite image can be constructed. Given the parallel imaging paths, this is the fastest area scanning technology producing medical diagnostic grade images of static objects that the inventors are aware of at this time (scanning, compressing, and storing an area of 225 mm$^2$ at 0.47 microns per pixel in 58 seconds). A related technology is the line scanning system, which sweeps a specimen (often projected through a microscope objective) past a linear array of sensor pixels. A major disadvantage of line scanning technology is that images are obtained line by line (n×1 pixels) as opposed to area by area (n×n pixels), as is the case with a more typical area based image sensor. A consequence is that line scan systems generally require extremely short exposure times and/or bright illumination to obtain high throughput, which is often not possible in biological applications where photo-damage, bleaching, and fluorescence must be considered.

With parallel image acquisition and a relatively slow re-positioning speed, the DMetrix excels at static and high fill factor applications. Fill factor is the percentage of the total observable area that is of interest and absolutely must be imaged or sensed for the application at hand. Because the ASOM of the present invention acquires images serially in time with extremely fast re-positioning speeds, the ASOM will excel in dynamic and/or low fill factor applications. Low fill factor applications include biological imaging of rare events over a large cell population, tracking multiple moving organisms, medical diagnostics of tissue sampled by needle extraction which is haphazardly placed on a microscope slide, etc. Most manufacturing applications require a low fill factor as only certain critical regions need to be observed or inspected with dynamic tracking of objects or features often required during assembly.

More generally, the ASOM of the present invention is particularly suitable for challenging spatial-temporal observation tasks requiring both a wide field of view and high resolution. Consideration of these issues motivated and contributed to the design of the ASOM.

TABLE 1

Qualitative comparison of Present Invention (ASOM) to other technologies.

|  | No specimen agitation during scanning | Preserves resolving power while expanding field of view | Easy manufacturing integration over conveyor transport | Scanning rate (movements or images per second) | Easily reconfig-ured for different viewing tasks | Illumination brightness requirements |
|---|---|---|---|---|---|---|
| Multiple Parfocal Objectives | X |  |  | LOW |  | NORMAL |
| Zoom Lens Design | X |  | X | MED |  | NORMAL |
| Moving Stage |  | X |  | MED | X | NORMAL |
| Moving Microscope | X | X | X | LOW | X | NORMAL |
| Multiple Microscopes |  | X | X | HIGH |  | NORMAL |

TABLE 1-continued

Qualitative comparison of Present Invention (ASOM) to other technologies.

| | No specimen agitation during scanning | Preserves resolving power while expanding field of view | Easy manufacturing integration over conveyor transport | Scanning rate (movements or images per second) | Easily reconfig-ured for different viewing tasks | Illumination brightness requirements |
|---|---|---|---|---|---|---|
| Basic Post-Objective Scanning | X | | X | HIGH | X | NORMAL |
| Dmetrix | X | X | | HIGH | | NORMAL |
| Line Scanning | | | X | HIGH | | VERY HIGH |
| ASOM present invention | X | X | X | HIGH | X | NORMAL |

Adaptive optics technology with deformable mirrors have been used to allow for high resolution imaging inside the human eye (see H. Hoffer, L. Chen, G. Y. Yoon, B. Singer, Y. Yamauchi and D. R. Williams, "Improvement in retinal image quality with dynamic correction of the eye's aberrations," Opt. Express 8, 631-543 (2001), http://www.opticsexpress.org/abstract.cfm?URI=OPEX-8-11-631), which is particularly challenging because of the time varying aberrations of the eye's lens. Similarly, deformable mirrors have also been used to correct for off-axis aberrations and sample induced wavefront disturbances in confocal microscopy. Expanding the field of view in imaging systems has also previously been shown with a liquid crystal spatial light modulator to create a foveated imaging system (see D. Wick, T. Martinez, S. Restaino, and B. Stone, "Foveated imaging demonstration," Opt. Express 10, 60-65 (2002), http://www.opticsexpress.org/abstract.cfm?URI=OPEX-10-1-60).

A confocal microscope of know design, uses a pinhole screen located in a plane that is conjugate to the object plane. This pinhole rejects light that is not at the same depth as the focal plane. The pinhole also rejects light that is not at the center of the field. Thus, the confocal microscope samples the object point by point. The image is built up point by point and there is a means for scanning the location of the imaging point on the specimen. A basic introduction to the confocal microscope can be found at: http://www.physics.emory.edu/~weeks/confocal.

The ASOM of the present invention acquires images using finite imagery (i.e. an entire 2 dimensional image is exposed all at once rather than building up an image point by point). The requirement to perform finite imagery imposes certain requirements on the optical system that are not necessary for point sampling techniques (confocal microscopy). Some of the advantages of the ASOM's finite imagery based approach are that multiple regions of the object are imaged in parallel, resulting in faster acquisition times. This is particularly important for low light conditions or when the object is in motion. There are also advantages with respect to the illumination requirements. However, a finite imagery based system does not offered ability to vertically "section" the sample as a confocal system can.

U.S. Pat. No. 6,771,417 discloses a non-confocal arrangement that includes adaptive optics. See U.S. Pat. No. 6,555,826 for a confocal arrangement including adaptive optics and U.S. Pat. No. 6,381,074 for an adaptive optics element in a scanning confocal microscope to assist in aberration control and precise focusing. U.S. Pat. No. 6,483,641 discloses a spatial light modulator used in a microscope.

SUMMARY OF THE INVENTION

It is an object of the present invention to provide an adaptive scanning optical microscope which has improved performance over the prior art in a wide variety of areas.

The ASOM design of the present invention shares the scanning and mosaic construction principle of the SOMS (again see U.S. patent application Ser. No. 10/525,422), however, the ASOM of the present invention differs from the SOMS and related post-objective systems performing finite imagery in that the ASOM incorporates an adaptive optics element to address off-axis aberrations introduced by a custom designed scanner lens that allows for aberrations not achieving the diffraction limit. Additionally, the ASOM differs from existing technologies in that the scanner lens is simplified by relaxing the flat field requirement and works with the steering mirror to project a significantly curved intermediate image field that rotates about its own center. Using these ideas to simplify the optical complexity and reduce the manufacturing and assembly requirements, the underlying concept of the novel ASOM is to use a low mass and very fast steering mirror located between the scanner lens and the imaging optics to form a post-objective scanning configuration.

An image is acquired at each scan position, and through image mosaic techniques, a large composite image of the object can be rapidly constructed. The advantages of such an arrangement are: a large effective field of view at high resolution, no disturbance to the sample, and the ability to achieve many movements/images per second. However, such a system configuration also poses significant design and implementation challenges due to the off-axis imaging, which are also addressed by the present invention, by:

1. Explicitly incorporating field curvature into the design to greatly reduce the complexity of the scanner lens.

2. In one mode of operation, an image is acquired and the associated light advanced along an optical path that includes an adaptive optics element (e.g. a deformable mirror, a spatial light modulator, an optical phased array, a deformable lens, or similar optical element) to correct for the residual aberrations that are scan position dependant.

3. Image processing to remove image distortion.

The ASOM design of the present invention excels in applications requiring high throughput, relatively low lighting conditions, and/or critical spatial-temporal observations, but will not offer the virtually unlimited field of view associated with a moving stage.

Biological applications where the ASOM would be attractive include observing dynamic cellular events (mitosis, viral attachment, motility, cellular response to chemical application) over a large population of living cells or observation of select regions of interest on samples. The ASOM would also be useful for rapidly acquiring images from well plates or for providing vision feedback in micro-injection or manipulation activities. By injecting light into the optical path and installing appropriate filters, epi-illumination modes would allow fluorescent imaging. By installing a phase plate near the aperture, phase contrast imaging could also be achieved for observation of predominately phase objects as is common in biology.

In industry, the ASOM allows for vision guided micro-assembly, processing, and rapid inspection of parts, with the potential for higher product throughput. For medical diagnostics, the ASOM allows for rapid imaging of biological samples. For example, in the case of biopsies obtained with a needle extraction, the sample is placed haphazardly on the slide and occupies only a small portion of the slide area. The ASOM will be able to perform a very rapid background scan and then a high quality scan of only the biopsy region of interest. The high speed of the rapid background scan will be obtained by imaging without stopping the steering mirror motion. These images will be slightly blurred, but will allow the tissue sample location to be identified. The ASOM will then plan a scanning trajectory to capture the region of interest. High quality images of the sample will then be acquired by obtaining the images with the steering mirror fully stopped and settled for each exposure.

Accordingly, a further objective of the present invention is to provide an adaptive scanning optical microscope which comprises a scanner lens assembly for acquiring images from different parts of an object plane and for forming a preferably curved image field having at least some aberration which varies as a function of the part of the object plane from which the image is acquired, a steering mirror for steering light from the image field and along a light path from the object plane to an final image plane, an adaptive optics component for receiving the steered light from the object plane to the image field and for dynamically compensating for the aberration, and additional optics along at least part of the light path for guiding, conditioning, and focusing the light as it moves from the steering mirror, past the adaptive optics element and to the final image plane.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
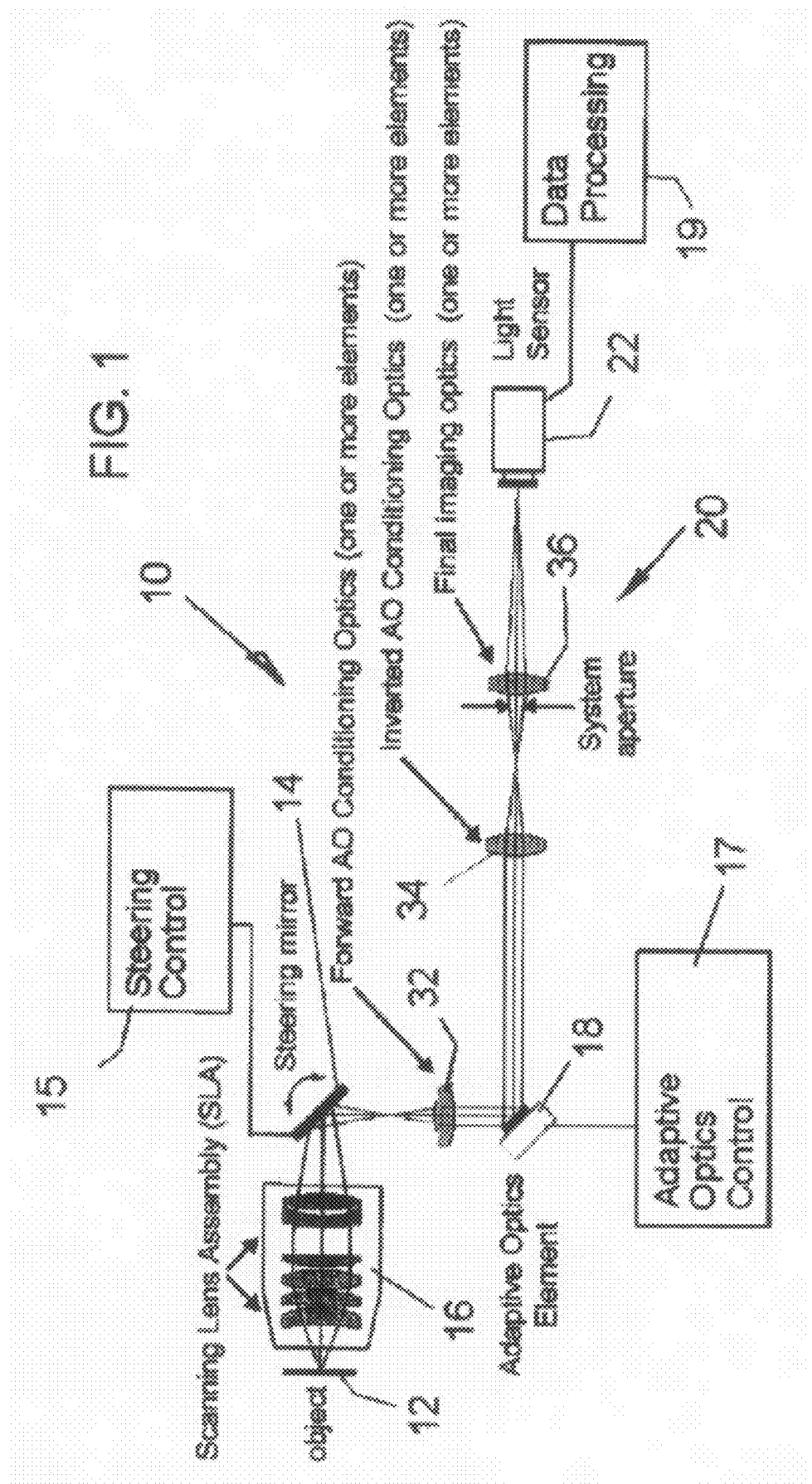
FIG. 1 is a schematic conceptual illustration of the adaptive scanning optical microscope or ASOM of the present invention.

Referring now to the drawings, in which like reference numerals are used to refer to the same or similar elements, FIG. 1 shows the adaptive scanning optical microscope or ASOM 10 which operates by taking a sequence of small spatially displaced images in succession from an object 12, and then assembling a large composite image (mosaic) or several disjoint or possibly overlapping images of the scene.

While the general concept of expanding the field of view while preserving resolving power through mosaic construction is known and has been applied to biological imaging (see J. Zemek, C. Monks, and B. Freiberg, "Discovery through automation," Biophotonics International 10, 54-57 (2003)) as well as to industrial imaging (see C. Guestrin, F. Cozman, and S. Godoy, "Industrial applications of image mosaicing and stabilization," in *Proceedings of IEEE International Conference on Knowledge-Based Intelligent Electronic Systems—Institute of Electrical and Electronics Engineers*, New York, 1998, vol. 2, pp. 174-183), instead of a moving stage as is common, the mechanism and scanning principle in the invention include a high speed 2-D steering mirror 14 working in coordination with a specially designed scanner lens assembly 16, an adaptive optics (AO) element 18 (for example, a deformable mirror, a spatial light modulator, an optical phased array, a deformable lens, or similar optical element), and additional imaging optics 20. The image is eventually sampled by a sensor, 22 e.g. a digital camera of suitable quality and speed, a spectrometer, or other light sensitive device.

The imaging optics 20 include forward AO (adaptive optics) conditioning optics or eye-piece 32, inverted AO conditioning optics or eye-piece 34 and final imaging optics 36, which may each be made up of one or more elements.

FIG. 1 also illustrates the at least one electronic system 15 for controlling the position of the steering mirror, and 17 for controlling the actuator signals to the adaptive optics element. At least one electronic system 19 is also provided for reading data from the sensor (e.g. camera 22) and at least one of displaying, processing and/or storing the acquired data of the light at the final image plane.

Figure 2:
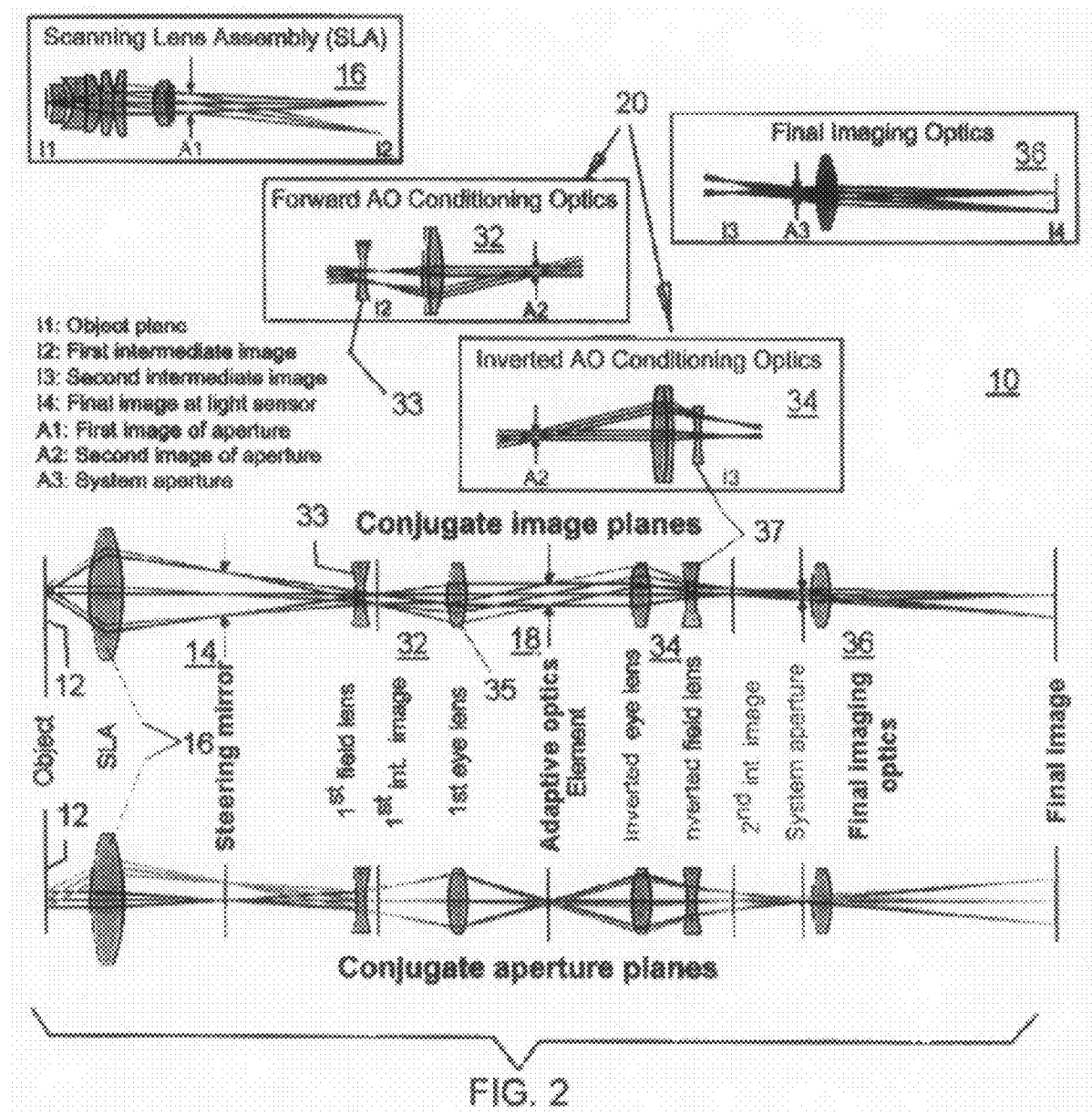
FIG. 2 is a composite diagram showing the various conjugate image and aperture planes of the invention.

FIG. 2 shows the conjugate image and aperture planes of the ASOM of the present invention, and partitions the optical elements into a scanner lens 16, forward eye-piece 32, inverted eye-piece 34, and final imaging optics 36, these last three optical assemblies or elements forming the additional image optics 20. The scanner lens 16 collects light from the object 12 or object plane 1 while the steering mirror 14, located at an image of the pupil, aims a projected real intermediate image. A first image of aperture A1 follows the SLA 16 which is followed in the light path, by a first intermediate image plane 2. Acting like a conventional eyepiece in a traditional optical microscope, the forward eye-piece 32 in the ASOM 10 samples the first intermediate image 2 and projects an external pupil to where the deformable mirror 18 is located.

The forward AO conditioning optics 32 in the preliminary design of the invention, resembles a Huygens' eyepiece in that the intermediate image 2 is located between a negative field-lens 33 and a positive eye-lens 35. A notable difference is the use of a negative field lens 33. This has the effect of lengthening the adaptive optics element relief (distance between eye-lens 35 and adaptive optics element e.g., the deformable mirror 18), but at a cost of a larger eye-lens 35. A second image of the aperture A2 follows the eye-lens 35. The inverted AO conditioning optics 34 resembles a Kellner eyepiece, but has a negative field lens 37 that follows the positive lens and the second image of the aperture A2. The negative field lens 37 also helps contribute to a negative Petzval sum in the imaging optics and establishes a second intermediate image plane 3.

For investigating the effectiveness of the present invention, the inventors did use the Huygens' and Kellner eyepiece like configurations. However, there are many configurations of eye-pieces that would work well here. In the experimental system set up in the lab the invention use eye-piece configurations that contain up to seven lens elements. It is not the type of eye-piece that is important, but the function of the eye-piece that is important to define the ASOM. For this reason, the forward and inverted eye-pieces of the present invention are better described as the forward and inverted AO conditioning optics.

An important point here is also that there are many different ways to construct the forward eye-piece pupil imaging optics, the inverted eye-piece pupil imaging optics and final imaging optics. For example, the simulated design discussed here uses two lens elements for the eye-pieces and one lens element for the final imaging optics. The experimental setup in the lab uses seven elements in the forward eyepiece, three in the inverted eyepiece, and seven in the final imaging optics. The person of ordinary skill in the art of optics, once understanding the principles of the present invention, will be able to assemble other embodiments of the invention.

The final imaging optics 36 relay the second intermediate image 3 to the sensor (e.g. the science camera 22—see FIG. 1) at the final image plane 4 with the proper magnification to prevent aliasing. The system aperture stop defines the boundary of the ray bundles accepted by the imaging system. Ultimately, the active area of the sensor will provide for a field stop, but an additional field stop can be added at the first and second intermediate image fields to reduce stray and unwanted light in the system. Other baffling and stray light reducing mechanisms such as machined grooves in the mechanical housings and a black coating applied to the surfaces would likely be used throughout the ASOM optical path.

The present invention also advantageously uses a curved field scanning layout that is different from a microscope objective or lithography lens.

Figure 3:
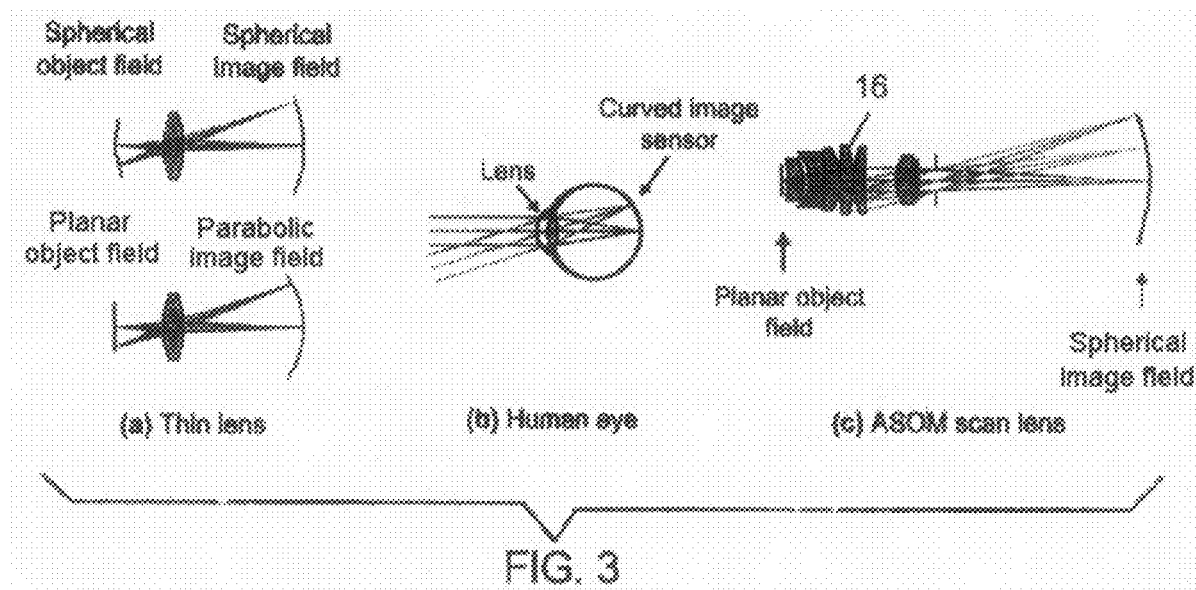
FIG. 3 is a multi-part illustration showing, at (a) the shape of the image field for a thin lens, at (b) the curved surface of the retina (image sensor) that allows for a very simple lens in the human eye, and at (c) the ASOM scanner lens of the present invention which is simplified by allowing a curved image field.

Referring to FIG. 3, in its area (c), the scanner lens 16 of the ASOM 10 of the present invention is designed to exhibit significant field curvature C with a relatively large Petzval sum. This relaxation of the flat field requirement offers the advantage of a greatly simplified optical design with far fewer lens elements, as the "natural" behavior of a lens is to image with a curved image field as shown in FIG. 3, area (a) for thin lenses and in area (b) for the human eye.

Because positive lens elements contribute positive Petzval sum and negative lens elements contribute negative Petzval sum, the design of flat field imaging systems requires careful use of both positive and negative lens elements to achieve a near zero system wide Petzval sum. Non-unity magnification is obtained by placing the negative lens elements at narrow beam diameter regions and positive lens elements at wide beam diameter regions. Compare the relatively simple ASOM scanner lens that allows for a curved image field as shown in FIG. 3 to flat field microscope objective and lithography lenses. Also note that the advantages of curved field designs have been recognized for aerospace applications (see J. M. Rodgers, "Curved Focal Surfaces: Design Optimization Through Symmetry, Not Complexity," Photonics Tech Briefs—Online (2003), http://www.ptbmagazine.com/content/040103ora.html), offering considerable weight savings and design simplicity.

Additional characteristics of the ASOM scanning system that are not typical optical design goals include:

1. The center of the field curvature, the rotation center for the 2-D steering mirror, the mirror surface, and an optical pupil plane are all mutually coincident.

2. The shape of the projected image surface is nearly spherical instead of the more typical parabolic surface associated with field curvature. This is achieved through higher order aberration control.

Figure 4:
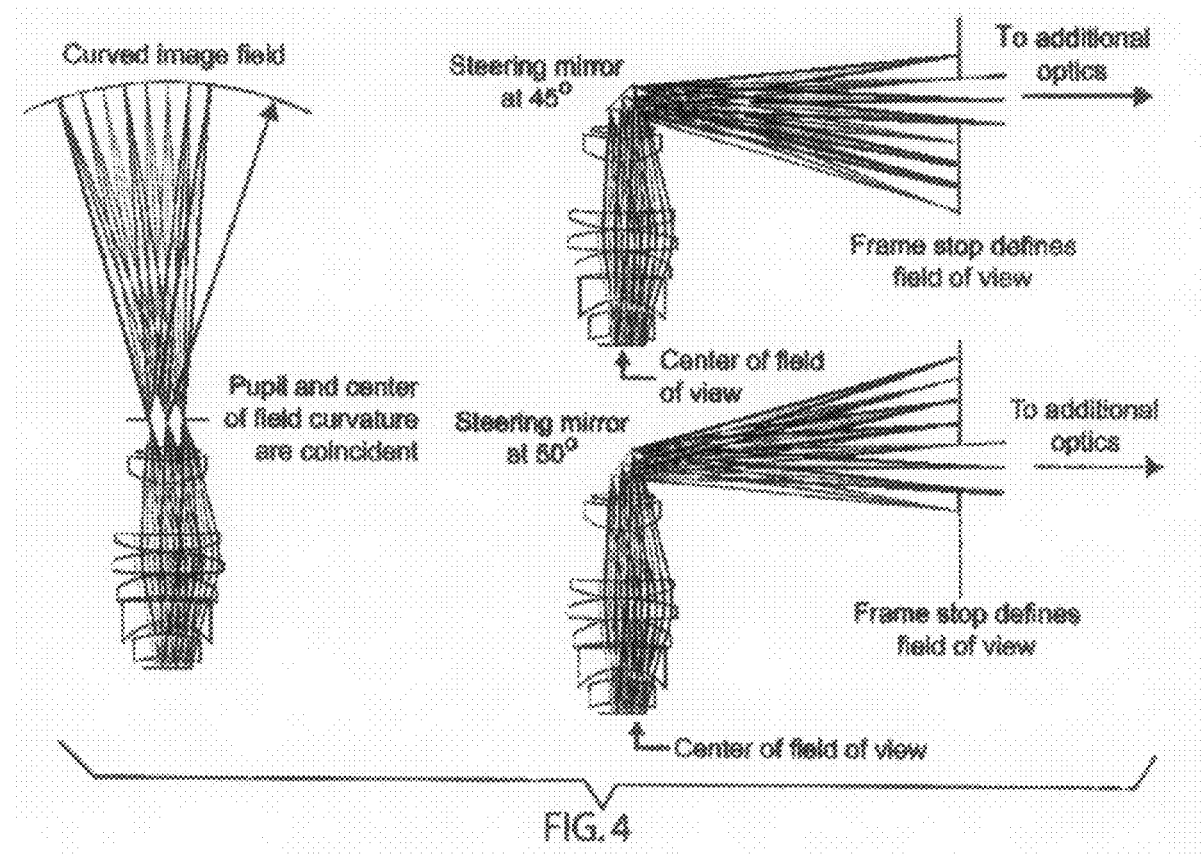
FIG. 4 is a composite illustration of the curved image field of the scanner lens assembly of the present invention.

Under the above mentioned conditions, as the steering mirror angle changes, the projected curved image surface rotates about its own center as shown in FIG. 4. Stationary imaging optics with a matching negatively curved imaging field work with a frame stop to sample a portion of the image surface, providing for an image scanning and selection mechanism as the steering mirror angle changes.

Figure 5:
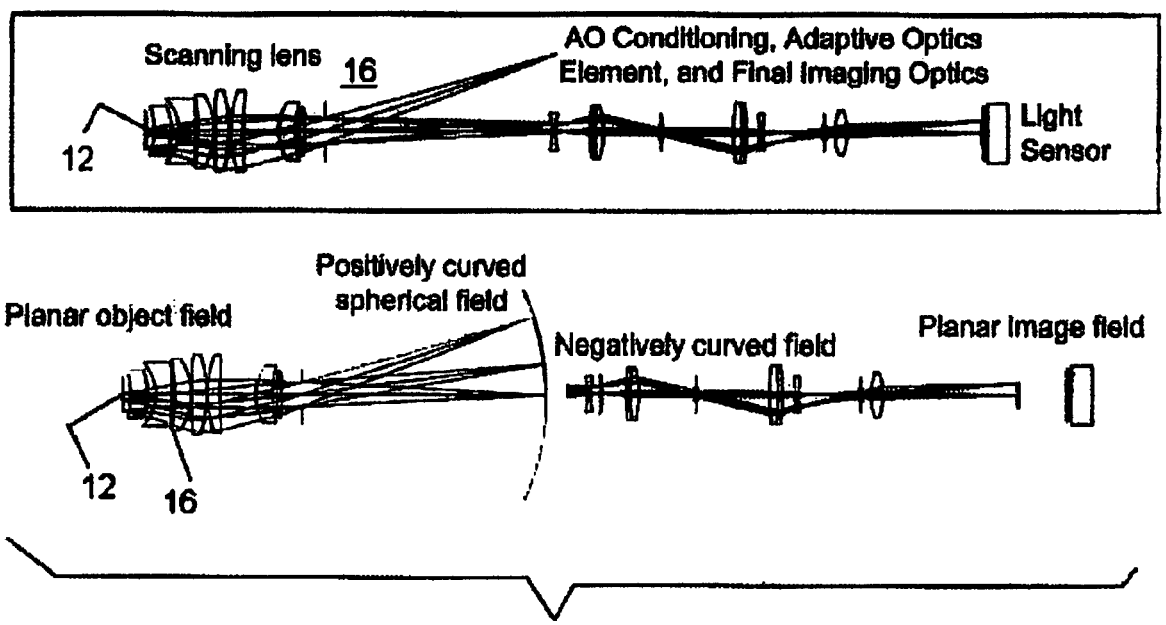
FIG. 5 is a composite illustration of the field curvature of the scanner lens assembly and imaging optics of the invention.

This layout is advantageous because it eliminates the need for a large and flat field imaging system. Instead, as shown in FIG. 5, the system exhibits (1) a large positively curved field associated with the scanner lens, and (2) a small negatively curved field associated with the imaging optics, thus avoiding the significant difficulty of designing and manufacturing a large continuous flat field imaging system as discussed above. In fact, because the imaging optics are low numerical aperture, small field size, and used predominantly on-axis, the inventors have found that off-the-shelf optics can provide sufficient aberration correction for diffraction limited performance when used with medium size sensor arrays (512×512 pixels). Larger sensor arrays may require custom imaging optics.

Figure 6:
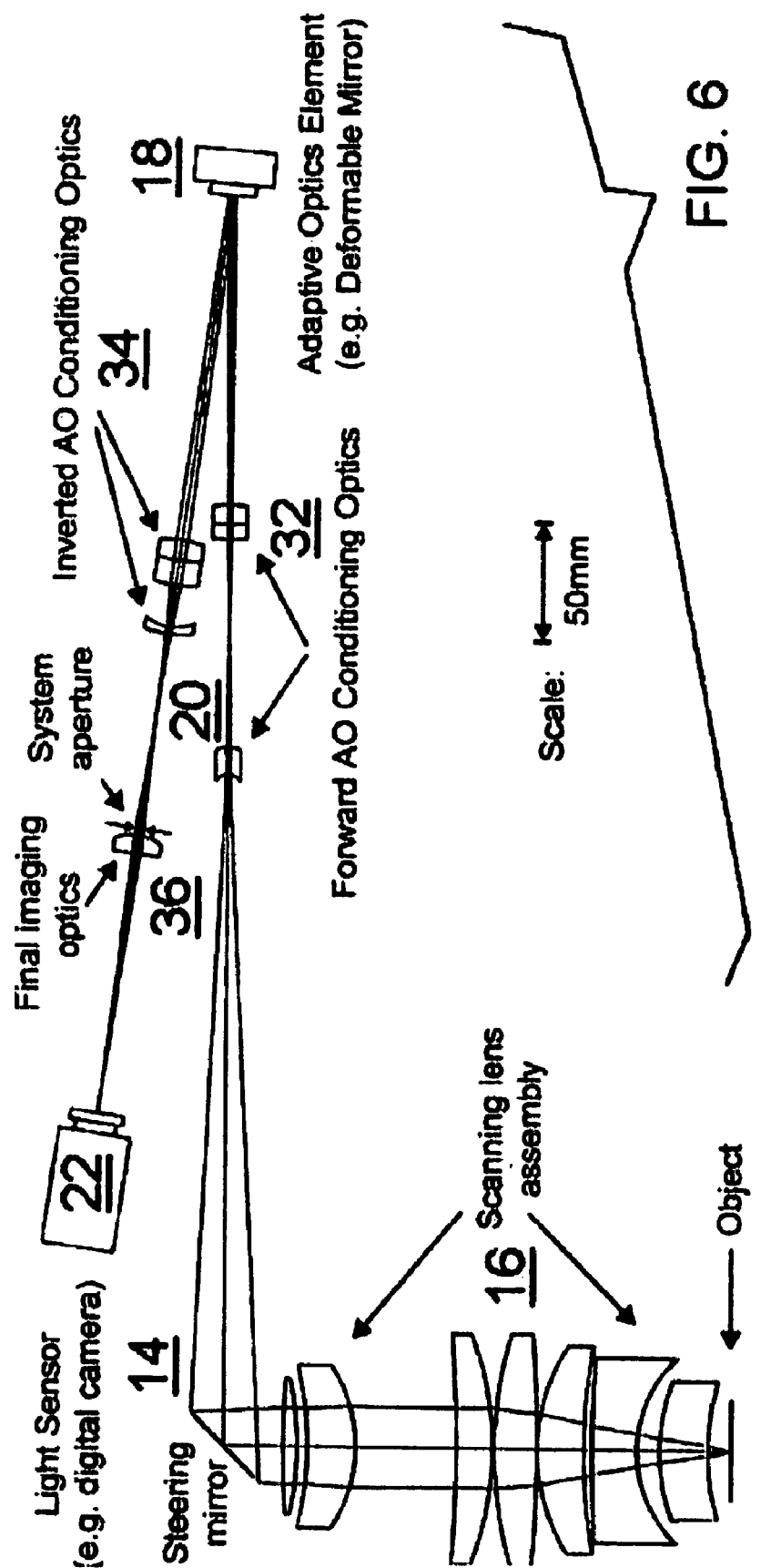
FIG. 6 is an illustration showing a preliminary design of the ASOM of the present invention.

Turning to FIG. 6 the adaptive optics element wavefront correction of the present invention will be described.

While the scanner lens 16 and overall system layout are explicitly designed to manage field curvature, other off-axis aberrations (e.g. coma, astigmatism, and other higher order aberrations) are still present. The traditional solution would be to add lens elements to balance the residual aberrations, but with such extreme off-axis imaging as performed in the ASOM, a fully compensated lens assembly would require a prohibitively large lens count.

The present invention circumvents this problem by designing a "good" scanner lens with significant wavefront aberration (up to several waves of optical path difference), and then uses a deformable mirror as the adaptive optics element 18 to compensate for the aberrations over the specific viewing field that is selected. Variation in the aberration is allowed between individual field positions throughout the scanner's range. However, given that the deformable mirror can only achieve one specific shape at a time, the rate of change in the aberration between field positions must be small enough to allow diffraction limited imaging performance over the entire sub-field of view that is selected.

This is similar to the concept of the isoplanatic patch in the atmosphere that is widely recognized in the adaptive optics telescope community. By analogy with the ASOM, the iso-planatic patch of the scanner lens must be larger than the selected sub-field of view. Otherwise, the image may blur at the edges of each sub-field of view.

The simulate results that follow are based on high fidelity ZEMAX simulations and demonstrate that the ASOM can effectively provide an expanded field of view while preserving resolution when compared to existing microscope technologies. Table 2 lists performance specifications of the specific ASOM design described here, but with suitable changes to the design, the field area and numerical aperture could be tailored to the observation task at hand. However, in general, as the field area increases, the realizable NA will decrease due to physical and practical limitations.

TABLE 2

Preliminary ASOM Performance Specifications

| | Specification |
|---|---|
| Effective field of view diameter | 40 mm |
| Total observable field area | 1257 mm$^2$ |
| Numerical aperture | 0.21 |
| Operating Wavelength | 510 nm |
| Resolution | 1.5 µm |
| Magnification | 15.2 |
| Camera pixel count | 512 × 512 |
| Camera pixel size | 10 µm |

Figure 7:
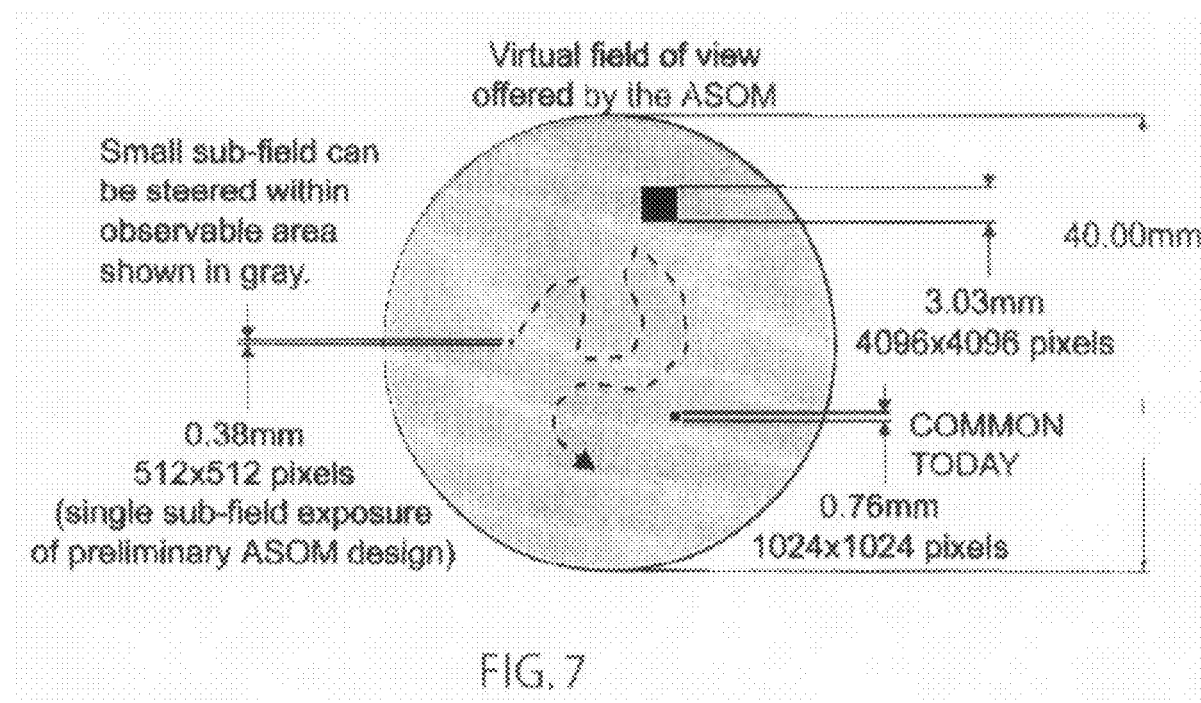
FIG. 7 shows a 40 mm virtual field of view of the ASOM of the present invention, as compared to that offered by a traditional microscope using 1024×1024 and 4096×4096 cameras (all systems operating at 0.21 NA), the 0.38 mm size of the ASOM sub-field of view being also shown with a 512×512 camera, requiring many scan movements to cover the entire 40 mm field.

FIG. 7 compares the observable field of view of the ASOM to a fixed microscope with a 4096×4096 camera (considered a full field camera with standard microscope objectives) and with a 1024×1024 camera, which is more common. The ASOM offers diffraction limited (Strehl ratio >0.8) for all field positions based on high fidelity simulation. The field sizes for the fixed microscope designs assume perfect imaging and were calculated using a 0.21 numerical aperture with $\lambda=0.510$ µm for the wavelength of light (green light is relatively nondestructive and desirable for imaging living biological cells).

Also shown in FIG. 7 is the sub-field of view offered by the 512×512 camera used in this ASOM implementation. In this design, the relatively simple imaging optics limit the camera sensor size to be about 6.0 mm in diameter for diffraction limited performance. This also shows the performance of only one specific implementation of the ASOM. With changes to the lens geometry, lens spacing, and digital camera pixel count, the field size and numerical aperture can be tailored to the observation task at hand. However, in general, there will ultimately be a tradeoff between the maximum observable field size and the numerical aperture of the system.

With a suitable redesign of the imaging optics, the diffraction limited field size of the imaging optics could be enlarged to use a higher pixel count camera. Nevertheless, even with the small 512×512 camera, the scan times listed in Table 3 are competitive with existing technologies. The table presents the estimated scan time for 100, 250, and 500 frames per second camera rate and for 100%, 50%, and 10% fill factors. These calculations assume that the total number of scan movements is given by: number of scans=total effective field area/sub-field area.

TABLE 3

Estimated scan times (sec.) for different camera pixel counts and scan rates

| | Camera frame rate: | | | | | | | | |
|---|---|---|---|---|---|---|---|---|---|
| | 100 fps | | | 250 fps | | | 500 fps | | |
| | | | | Fill factor (%): | | | | | |
| | 100 | 50 | 10 | 100 | 50 | 10 | 100 | 50 | 10 |
| 512 × 512 pixels | 87 | 44 | 8.7 | 35 | 17 | 3.50 | 17 | 8.74 | 1.7 |
| 1024 × 1024 pixels | 22 | 11 | 2.2 | 8.7 | 4.4 | 0.87 | 4.4 | 2.18 | 0.44 |
| 4096 × 4096 pixels | 1.4 | 0.68 | 0.14 | 0.55 | 0.27 | 0.054 | 0.27 | 0.14 | 0.027 |

Figure 8:
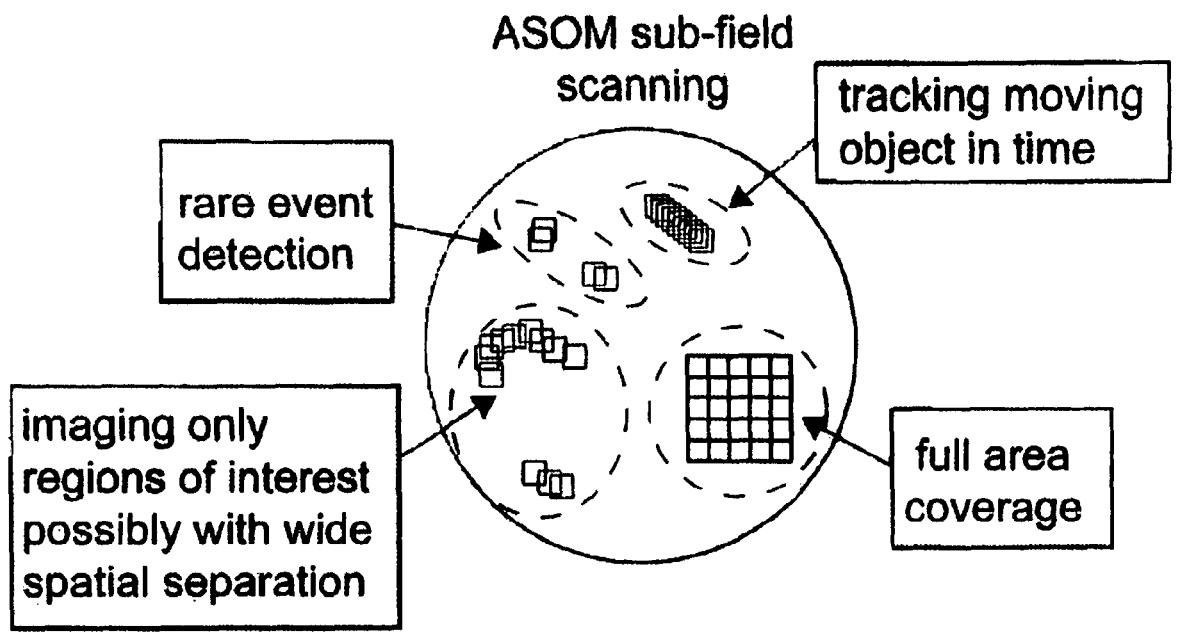
FIG. 8 is a diagram that shows some of the different operating modes of the ASOM of the present invention.

FIG. 8 illustrates different operating modes of the ASOM of the present invention, such as rare event detection, tracking moving objects in time, imaging only regions of interest and full area coverage.

Figure 9:
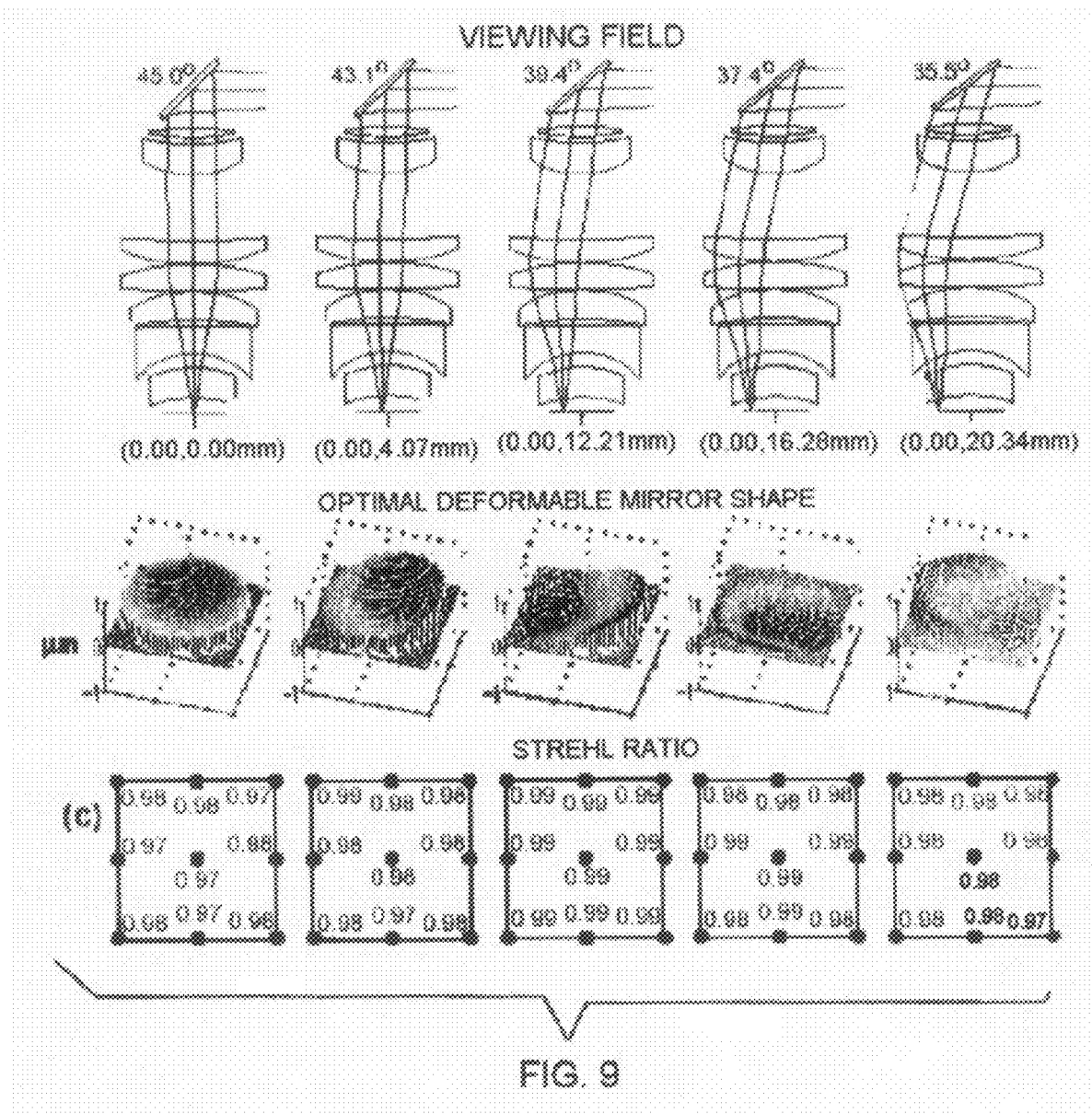
FIG. 9 is a composite view illustrating, at (a), different field positions of the invention, at (b), optimal deformable mirror shape for each specific field position and at (c), Strehl ratios sampled over the selected field of view.

FIG. 9 shows how the DM corrects for the specific wavefront aberration associated with each field position. Over the entire field and for all field positions, the Strehl ratio is much greater than the diffraction limit of 0.8, resulting in near perfect imaging. Area (a) illustrates five different field positions. Area (b) illustrates the five corresponding optimal deformable mirror shapes for each respective field position and area (c) gives the Strehl ratio sampled over the selected field of view.

All results presented here are based on idealized simulations ignoring the reality that lenses and optical housings are always subject to manufacturing and assembly tolerances.

To demonstrate the basic principle of scanning and image mosaic construction of the present invention the following experimental hardware was built as a first generation prototype called the Scanning Optical Mosaic Scope (SOMS). No formal optimization of this design was performed, and the prototype unit was constructed using standard catalog lenses available from ThorLabs, a Sony XC-77BB CCD camera, Matrox Meteor II frame grabber, Cambridge technologies galvanometers and servo drivers, and a TI based DSP board.

It differs from the more advanced ASOM design proposed here in that: (1) the optical layout is simplified, (2) there is no deformable mirror or adaptive optics, (3) all lenses are available as standard catalog items, (4) the scanner lens is a single standard achromat doublet. These results of the SOMS are included here to demonstrate possible modes of operation, functionality, and capabilities that can be performed with the ASOM, but with better performance by using the ASOM design.

A Micro-assembly demonstration of the invention is based on a shape memory alloy micro-gripper moving between two fixed objects in a workspace. A rudimentary correlation based image matching algorithm and Kalman filter are used to track the motion of the gripper tip. A 3×3 tile mosaic images the gripper and the scanning pattern is automatically adjusted to maintain the gripper tip in the center tile. The scan pattern also includes the two stationary objects in the workspace, demonstrating the capability of the SOMS to observe multiple stationary and moving objects in the workspace nearly simultaneously.

A sequence of video footage was taken, specifically of living biological cells (Telomerase-Immortalized hTERT-RPE1). A 3×3 tile image mosaic monitors a large cell population without disturbing the cells, which are kept alive in a temperature regulated nutrient solution. Several events of mitosis (cell division) can be seen occurring throughout the viewing field. The ASOM not only offers the possibility of automatically detecting the onset of mitosis and other events, but can be easily programmed to track and record multiple events at the same time. While automated quantitative cell analysis using a moving stage has recently been proposed, the bandwidth of the overall system is still constrained by the response of the stage and the sensitivity of the cell specimen to motion.

The ASOM of the present invention addresses both of these issues.

The inventors have also build a second generation experimental prototype.

The purpose of this experimental ASOM apparatus was to demonstrate the essential optical aspects of the ASOM design, but at low cost and with a short development time.

As such, off the shelf optics were used exclusively to avoid the considerable cost of custom ground optics and to take advantage of the existing stock of catalog available items that ship within days. However, most stock lenses are designed to be used in a particular manner (e.g. with infinite conjugates) for generic applications and are offered in a coarse range of focal distances, lens diameters, and glass selections. Considering the atypical imaging characteristics of the scanner lens, the experimental ASOM design using off-the-self optics only is far from optimal, and as such, exhibits a noticeably high lens count to achieve 0.1 NA over a nominal 20 mm field size. However, even with the use of off-the-shelf optics only, this experimental apparatus has been carefully designed to demonstrate the critical optical characteristics that define the ASOM, including the curved field optical scanning approach and wavefront correcting optics using a deformable mirror as the adaptive optics element. In this implementation, the steering mirror is manually actuated, limiting the microscope to observing static or slow moving objects. A commercial version of the adaptive scanning optical microscope would likely utilize custom manufactured optics to fully realize the potential of the ASOM concept to achieve higher numerical aperture and a larger workspace as well as incorporate an actuated high speed steering mirror.

Figure 10:
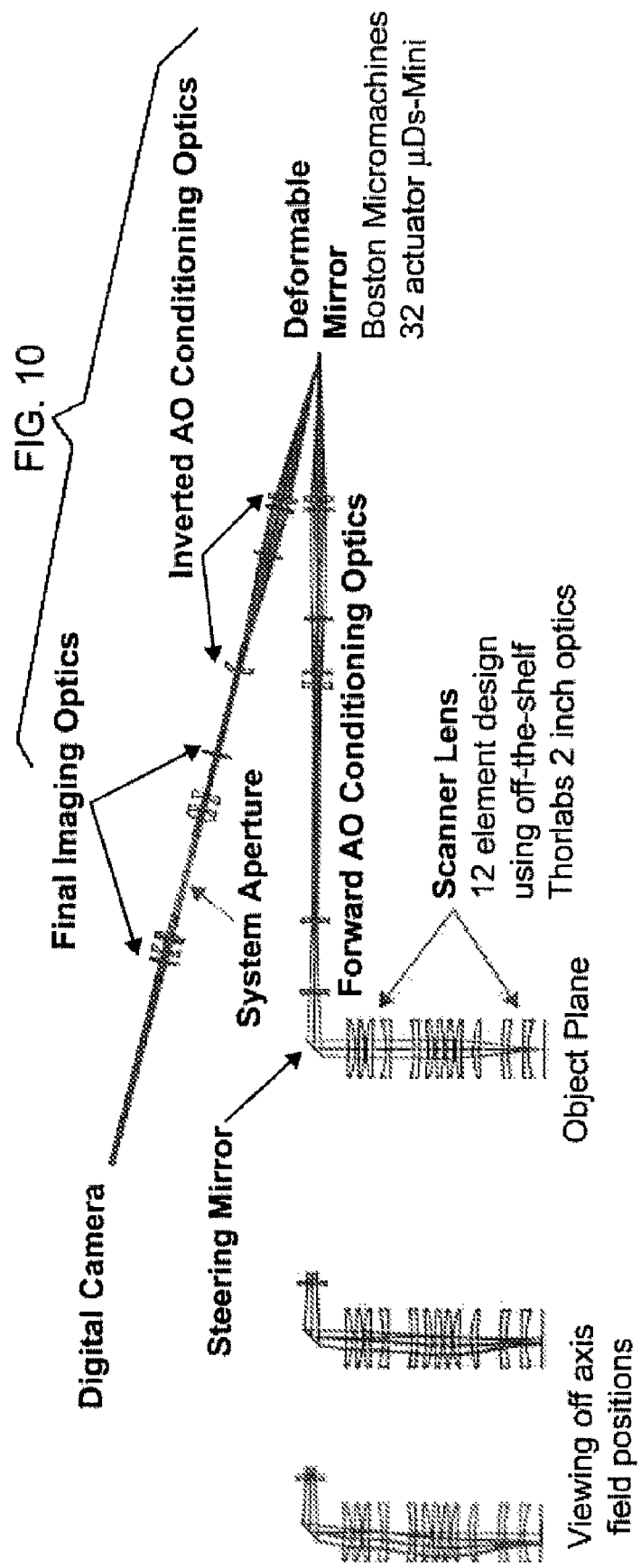
FIG. 10 is an optical layout of the inventors' latest experimental setup for demonstrating the principles of the present invention.

FIG. 10 shows the optical layout for this experimental system. This initial prototype utilizes a transmitted lighting scheme and because the current design is very sensitive to chromatic aberration, a 510 nm wavelength notch filter is used to eliminate much of the light spectra below 500 nm and above 520 nm. Light transmits through the object contrast pattern and is then collected by the telecentric twelve element scanner lens assembly, which projects an image of the object onto a spherically curved image field. A manually actuated steering mirror with kinematics that pivot the mirror about its silvered front surface is located after the scanner lens assembly, and working in coordination with a field stop in the wavefront correcting optics, selects which portion of the spherically curved image field passes through the system to form an image at the camera. This scanning mechanism effectively allows for the steering of the sub-field of view within the workspace. However, the light at this point exhibits significant wavefront aberration as a result of the poor optical correction of the scanner lens (note that allowing for poor correction is a characteristic of the ASOM design as it significantly reduces the complexity and lens count of the scanner lens assembly).

This poorly corrected light from the steering mirror that passes through the field stop, then continues into the wavefront correcting optics. A MEMS deformable mirror is used in this embodiment of the adaptive scanning optical microscope. By precisely controlling the shape of the reflective surface of the mirror to be opposite the shape of the wavefront error (but at half the amplitude), the deformable mirror can correct for the wavefront aberrations to within the diffraction limit. Thus light leaving the deformable mirror is well corrected and will form an image on the camera that is nearly indistinguishable from a perfect diffraction limited image. A three layer MEMS deformable mirror available from Boston Micromachines Corp. was used in this prototype. This mirror has 32 electrostatic actuators with 400 µm actuator spacing, a 2.5 µm actuator stroke, and a 2.0 mm diameter actively controlled area. The 2.5 µm stroke is capable of correcting for several waves of aberration, which allows for high image quality even for the off-axis field positions, enabling the greatly expanded field of view in the ASOM. Also notice in this design that the pre-conditioning stage for the adaptive optics element and the post-conditioning stage for the adaptive optics element are comprised of a suitable combination of positive and negative lens elements to condition the light to match the 2.0 mm active diameter of the adaptive optics element. The pre-conditioning stage for the adaptive optics element forms an image of the aperture such that the steering mirror is located in the vicinity of the aperture image. Placing the steering mirror at or near the aperture image allows for the diameter of the steering mirror to be made small to reduce the inertia of the steering mirror for faster dynamic performance. Additionally, placing the steering mirror at or near the aperture image is optically desirable because doing so facilitates symmetric use of the scanner lens during scanning (i.e. the chief rays for all field positions originate from the same location in the aperture plane). The optical benefits of using a single steering mirror are well know, but for a variety of reasons, including cost and dynamic performance, it is conceivable that the single steering mirror described here would be replaced by two single axis steering mirrors. Doing so is less desirable from an optical standpoint, but is often adequate and is quite often done in practice. An ASOM could be constructed using two or more rotating mirrors.

Like the steering mirror, the adaptive optics element is located in the vicinity of an image of the aperture. Locating the adaptive optics element at or in the vicinity of an image of the aperture makes effective use of the active region of the adaptive optics element because all of the ray bundles overlap at this location (i.e. the chief rays cross the optical axis). Locating the adaptive optics element at or near where the chief rays intersect also allows one adaptive optics wavefront correction (e.g. deformable mirror shape) to effectively correct for the aberrations in each ray bundle, as they are similar across each instantaneous field of view.

The inventors have also since performed the calibration and online optimization with the next generation prototype using an image based performance metric and the parallel stochastic gradient descent optimization algorithm:

The ultimate image quality of the adaptive scanning optical microscope depends on the magnitude and shape of the residual wavefront aberrations in the system. Additionally, the scanner lens introduces aberrations specific to each field position (steering mirror angle). Thus, given that the adaptive optics element influence on the wavefront shape is controlled by the control signals and has a direct effect on the wavefront aberrations, an initial calibration of the adaptive scanning optical microscope should be performed. The goal of this calibration is to find a set of control signals that minimize the wavefront aberrations for different field positions. Once calibrated, the optimal control signals can be recalled during normal operation, possibly from a lookup table and using interpolation. This calibration can compensate for manufacturing and assembly errors, tolerances, or other variations in manufacturing, and may be periodically repeated to compensate for changes in environmental temperature, shifting or changing of optical components, or other sources of aberration in the system. During operation, the steering mirror and adaptive optics element would likely be coordinated by an electronic system for effective compensation of optical aberrations during imaging.

There are many potential methods to obtain the optimal adaptive optics control signals, including using a wavefront sensor, wavefront estimating experimental methods and algorithms, interferometer based methods, or other image based technique. It is also conceivable that the adaptive scanning optical microscope system would update the adaptive optics element's control signals during runtime using a real-time measurement of the wavefront aberrations and feedback control similar to as is done with adaptive optics telescopes using a guide star as a reference wavefront.

For this experimental prototype, a performance metric and a numerical optimization algorithm were used. In general, the performance metric, Q(u), is a nonlinear function of adaptive optics control signals, u, and Q(u) is defined to decrease with improving image quality. The resulting optimization problem is also subject to upper and lower bounds on the adaptive optics control signals. Combining a metric based on the high frequency image content and the parallel stochastic-gradient-descent (PSGD) optimization algorithm has been demonstrated to effectively calibrate the system. In general, the adaptive optics control signal optimization requires two parts for which there are a variety of possible options and specific combinations:

1. a metric to represent the image quality, Q (u); and
2. an optimization algorithm to minimize Q(u).

Additional enhancements to the ASOM described above include using a spectrometer in place of the camera. Introducing a phase plate near the aperture and/or using the adaptive optics element to introduce a phase perturbation to the wavefront would allow the ASOM to perform phase contrast imaging. Light could also be injected into the ASOM as a means to illuminate the object, possibly by introducing a beam splitter into the optical path.

In conclusion, the present invention is a new microscope concept that can simultaneously achieve high resolution and a large effective field of view that offers several advantages over the current state of the art for observing certain spatial-temporal events. The design draws heavily on the synergy of an optical, mechanical, motion control, and image processing design. ZEMAX optical simulations show diffraction limited imaging performance over a greatly enlarged field of view, while calculations show the possibility for high speed movement and image acquisition operation. A reduced functionality proof-of-concept prototype has been constructed to demonstrate the basic efficacy of the mirror based scanning approach and we demonstrate with both micro-assembly and biological observation tasks.

The scanner lens assembly, the forward and inverted conditioning optics, and the final imaging optics of the invention, can each be constructed of one or more glass lens elements; plastic lens elements; GRIN (graduated index of refraction) elements; diffractive lens elements; spherical optical elements; aspherical optical elements; elements or collection of elements exhibiting an external pupil, a telecentric behavior, a non-telecentric behavior; a uniform numerical aperture for all field positions, a non-uniform numerical aperture for different field positions; an element or collection of elements that substantially obeys an f-theta distortion mapping, an f-cosine-theta distortion mapping, an f-sine-theta distortion mapping; an element or collection of elements that projects a curved image field at a first intermediate image plane, a curved image field at the first intermediate image plane that is substantially spherical, and a curved image field at the first intermediate image plane that is substantially parabolic.

The image steering mirror can be generalized as any image steering means or equivalent for performing the steering function, and these means may include means for steering including at least one galvanometer, voice coil actuator, piezo electric actuator, electrostatic actuator, gimbal mechanism, a parallel mechanism, a flexure mechanism, or a electromagnetic levitation. The steering mirror may be at least one of a flat reflecting surface, a curved reflecting surface, a curved reflecting surface that is substantially spherical, a curved reflecting surface that is substantially aspherical, or a rotating prism. The sensor for receiving light at the final image plane can be at least one of: a digital camera, a charged coupled device, a CMOS sensor, a spectrometer, or an eyepiece for view with the human eye.

While specific embodiments of the invention have been shown and described in detail to illustrate the application of the principles of the invention, it will be understood that the invention may be embodied otherwise without departing from such principles.

What is claimed is:

1. An adaptive scanning optical microscope comprising:
    a scanner lens assembly for performing finite imagery from different selected field positions of an object such that optical aberrations vary as a function of the selected field position, the scanner lens assembly forming an image field;
    image steering means for steering light from each field position, and along a light path from the object to a final image plane, the light along the light path having a wavefront;
    an adaptive optics element for affecting the shape of the wavefront in the light path to compensate for at least some of the field position dependant optical aberrations and for introducing a selected shape into the wavefront of the light along the optical path;
    additional image optics along at least part of the light path for conditioning the light for the adaptive optics element and for the final image plane; and the final imaging optics for projecting images at the final image plane.

2. The adaptive scanning optical microscope of claim 1, wherein the image field formed by the scanner lens assembly is curved.

3. The adaptive scanning optical microscope of claim 1, wherein the image steering means comprises a steering mirror and means for steering the mirror.

4. The adaptive scanning optical microscope of claim 1, wherein the adaptive optics element comprises a deformable mirror.

5. The adaptive scanning optical microscope of claim 1, wherein the additional image optics comprise a pre-conditioning stage for the adaptive optics element that conditions the light along the optical light path to match aperture dimensions of the adaptive optics element to optical requirements for the scanner lens assembly, so as to use an active region of the adaptive optics element, and a post-conditioning stage for the adaptive optics element that conditions the light along the optical path to match aperture dimensions of the adaptive optics element to requirements for the final imaging optics.

6. The adaptive scanning optical microscope of claim 5, wherein the pre-conditioning stage for the adaptive optics element and the post-conditioning stage for the adaptive optics element both comprise at least one negative lens and at least one positive lens.

7. The adaptive scanning optical microscope of claim 1, including an aperture stop for defining the boundary of the light bundles accepted by the instrument and projected onto the final image plane.

8. The adaptive scanning optical microscope of claim 1, including the final imaging optics providing additional magnification or demagnification to achieve a selected overall system magnification and for projecting a final image to the final imaging plane, and a light sensor for sensing the final image.

9. The adaptive scanning optical microscope of claim 1, wherein the scanner lens assembly comprises an opto-mechanical assembly of one or more lens or mirror elements including at least one of: glass lens elements; plastic lens elements; GRIN lens elements; diffractive lens elements; spherical optical elements; aspherical optical elements; at least one element for exhibiting an external pupil, a telecentric behavior, a non-telecentric behavior; a uniform numerical aperture for all field positions, a non-uniform numerical aperture for different field positions; at least one element that substantially obeys an f-theta distortion mapping, an f-cosine-theta distortion mapping, an f-sine-theta distortion mapping; at least one element that projects a curved image field at a first intermediate image plane, a curved image field at the first intermediate image plane that is substantially spherical, and a curved image field at the first intermediate image plane that is substantially parabolic.

10. The adaptive scanning optical microscope of claim 1, wherein the image steering means comprises a steering mirror and means for steering the steering mirror, the means for steering the steering mirror being selected from the group consisting of: at least one galvanometer, voice coil actuator, piezo electric actuator, electrostatic actuator, gimbal mechanism, a parallel mechanism, a flexure mechanism, electromagnetic levitation; and the steering mirror has at least one of a flat reflecting surface, a curved reflecting surface, a curved reflecting surface that is substantially spherical, a curved reflecting surface that is substantially aspherical, and a rotating prism.

11. The adaptive scanning optical microscope of claim 1, wherein the adaptive optics element comprises at least one of: deformable mirror; spatial light modulator; an optical phased array; a deformable lens; and an electro-optical element.

12. The adaptive scanning optical microscope of claim 1, wherein the additional image optics comprise a forward conditioning optics for the adaptive optics element comprised of at least one of: a glass lens element, a plastic lens element, a GRIN lens element, a diffractive lens element, a spherical lens element, and an aspherical lens element; inverted conditioning optics comprised of at least one of: a glass lens element, a plastic lens element, a GRIN lens element, a diffractive lens element, a spherical lens element, and an aspherical lens element; and the final imaging optics comprise at least one of: a glass lens element, a plastic lens element, a GRIN lens element, a diffractive lens element, a spherical lens element, and an aspherical lens element.

13. The adaptive scanning optical microscope of claim 1, including a sensor for receiving light at the final image plane, the sensor comprising at least one of: a digital camera, a charged coupled device, a CMOS sensor, a spectrometer, and an eyepiece for viewing with the human eye.

14. An adaptive scanning optical microscope comprising:
a scanner lens assembly for acquiring images from different parts of an object plane and for forming a curved image field having at least some aberration which varies as a function of off-axis regions of the object plane from which the image is acquired;
a steering mirror for steering light from the image field and along a light path from the object plane to a final image plane;
a deformable mirror for receiving the steered light from the object to the image field and for dynamically compensating for at least some aberration; and
additional image optics along at least part of the light path for guiding the light as it moves from the steering mirror, past the deformable mirror and to the final image plane, the additional image optics including a forward eye-piece between the steering mirror and the deformable mirror along the light path, an inverted eye-piece between the deformable mirror and a system aperture of the microscope along the light path, and final imaging optics between the inverted eye-piece and the final image plane.

15. The adaptive scanning optical microscope of claim 14, wherein the forward eye-piece includes at least one negative field lens and at least one positive lens, the inverted eye-piece having at least one negative field lens and containing at least one positive lens, the final imaging optics having at least one positive lens.

16. The adaptive scanning optical microscope of claim 14, wherein the forward eye-piece includes at least one negative field lens and at least one positive lens, the inverted eye-piece having at least one negative field lens and containing at least one positive lens, the final imaging optics having at least one positive lens, the microscope including a camera for receiving light at the final image plane.

17. An adaptive scanning optical microscope comprising:
a scanner lens assembly for acquiring images from different parts of an object plane and for forming a curved image field having at least some aberration which varies as a function of the region of the object plane from which the image is acquired;
a steering mirror for steering light from the image field and along a light path from the object plane to a final image plane;
a deformable mirror for receiving the steered light from to the image field and for dynamically compensating for the at least some aberration;

additional image optics along at least part of the light path for guiding the light as it moves from the steering mirror, past the deformable mirror and to the final image plane, the additional image optics including a forward eye-piece between the steering mirror and the deformable mirror along the light path, an inverted eye-piece between the deformable mirror and a system aperture of the microscope along the light path, and final imaging optics between the inverted eye-piece and the final image plane; and a science camera for receiving light at the final image plane.

18. The adaptive scanning optical microscope of claim 17, wherein the forward eye-piece includes at least one negative field lens and at least one positive lens, the inverted eye-piece having at least one negative field lens and containing at least one positive lens, the final imaging optics having at least one positive lens.

19. An adaptive scanning optical microscope comprising:

a scanner lens assembly for performing finite imagery from different selected field positions of an object such that optical aberrations vary as a function of the selected field position, the scanner lens assembly forming a first intermediate image;

image steering means for steering light from the first image of the aperture for each field position, and along a light path from the object to a final image plane, the light along the light path having a wavefront and a first intermediate image plane;

an adaptive optics element for affecting the shape of the wavefront in the light path to compensate for at least some of the field position dependant optical aberrations and for introducing a selected shape into the wavefront of the light along the optical path, the adaptive optics element located at a second image of an aperture;

a pre-conditioning stage for the adaptive optics element that conditions the light along the optical light path to match aperture dimensions of the adaptive optics element to optical requirements of the scanner lens assembly so as to effectively use active regions of the adaptive optics element;

a post-conditioning stage for the adaptive optics element that conditions the light along the optical path to match aperture dimensions of the adaptive optics element to requirements for a final imaging optics and for projecting light at a second intermediate image plane; and final imaging optics for projecting images at the final image plane, from the second intermediate image plane.

20. The adaptive scanning optical microscope of claim 19, including an aperture stop for defining the boundary of the light bundles accepted through the imaging system and projected to the final image plane.

21. The adaptive scanning optical microscope of claim 19, including at least one sensor for sampling the final image and converting light information into a measurable quantity.

22. The adaptive scanning optical microscope of claim 21, including at least one electronic system for controlling the position of the steering mirror and for controlling the actuator signals to the adaptive optics element.

23. The adaptive scanning optical microscope of claim 22, including at least one electronic system for reading data from the sensor.

24. The adaptive scanning optical microscope of claim 23, including at least one electronic system for at least one of displaying, processing and storing acquired data of light at the final image plane.

* * * * *